US009000072B2

(12) United States Patent
Schenk, III

(10) Patent No.: US 9,000,072 B2
(45) Date of Patent: Apr. 7, 2015

(54) METHOD AND SYSTEM FOR PROCESSING UNFERMENTED GRAIN SOLIDS AND UTILIZING THE PRODUCTS THEREOF

(75) Inventor: Raymond Lyle Schenk, III, Chanhassen, MN (US)

(73) Assignee: Laurel Biocomposite, LLC, Laurel, NE (US)

( * ) Notice: Subject to any disclaimer, the term of this patent is extended or adjusted under 35 U.S.C. 154(b) by 78 days.

(21) Appl. No.: 13/562,533

(22) Filed: Jul. 31, 2012

(65) Prior Publication Data

US 2013/0035424 A1 Feb. 7, 2013

Related U.S. Application Data

(60) Provisional application No. 61/600,760, filed on Feb. 20, 2012, provisional application No. 61/513,918, filed on Aug. 1, 2011.

(51) Int. Cl.
| | |
|---|---|
| C12P 7/08 | (2006.01) |
| C08K 11/00 | (2006.01) |
| C08L 89/04 | (2006.01) |
| C08L 97/02 | (2006.01) |
| A23K 1/06 | (2006.01) |

(52) U.S. Cl.
CPC .............. *C08L 97/02* (2013.01); *C08K 11/00* (2013.01); *C08L 89/04* (2013.01); *A23K 1/06* (2013.01); *Y02E 50/17* (2013.01)

(58) Field of Classification Search
CPC ............. C12P 7/08; C08K 11/00; A23K 1/06
USPC ............................................................ 524/9
See application file for complete search history.

(56) References Cited

U.S. PATENT DOCUMENTS

| | | | |
|---|---|---|---|
| 2,040,033 A | 5/1936 | Sturken | |
| 2,156,927 A | 5/1939 | Sturken | |
| 2,178,924 A | 11/1939 | Sturken | |
| 2,285,758 A | 6/1942 | Sturken | |
| 2,361,713 A | 10/1944 | Sturken | |
| 4,320,208 A | 3/1982 | Reischl | |
| 4,529,407 A | 7/1985 | Johnston | |
| 5,705,216 A | 1/1998 | Tyson | |
| 6,274,178 B1 | 8/2001 | Beven | |
| 2004/0249065 A1 | 12/2004 | Schilling | |
| 2008/0131947 A1 | 6/2008 | Wicking | |
| 2008/0167436 A1* | 7/2008 | Schilling et al. | 527/300 |
| 2009/0181126 A1* | 7/2009 | Wicking et al. | 426/61 |
| 2010/0087687 A1* | 4/2010 | Medoff | 568/840 |

OTHER PUBLICATIONS

"Design properties for molded, corn-based DDGS-filled phenolic resin", R.A. Tatara, K.A. Rosentrater, S. Suraparaju, pp. 9-15, Industrial Crops and Products 29 (2009) 9-15.
"Compression Molding of Phenolic Resin and Corn-based DDGS Blends", R.A. Tatara, S.Suraparaju, K.A. Rosentrater, J Polym Environ (2007), pp. 1-7, published online Apr. 11, 2007, copyright Springer Science +Business Media, LLC, 2007.
"Analytical and Experimental Studies of Properties of Ethanol Coproduct-Filled Plastics", Otieno et al., pp. 1-12, Proceedings of the 2006 IJME—INTERTECH Conference.
"Chemical modification of zein by bifunctional polycaprolactone (PCL)", Wu et al., pp. 1-11, Polymer 44 (2003) 3909-3919, copyright 2003 Elsevier Science Ltd.
"Preliminary Studies on Converting Agricultural Waste into Biodegradable Plastics, Part I: Corn Distillers' Dry Grain", Schilling et al., pp. 1-8, Journal of Polymers and the Environment, vol. 12, No. 4, Oct. 2004.
"Preliminary Studies on Converting Agricultural Waste into Biodegradable Plastics, Part II: Corncobs", Schilling et al., pp. 1-7, Journal of Polymers and the Environment, vol. 13, No. 1, Jan. 2005.
"Preliminary Studies on Converting Agricultural Waste into Biodegradable Plastics, Part IV: Polysaccharide Containing Natural Materials", Schilling et al., pp. 1-9, Journal of Polymers and the Environment, vol. 13, No. 3, Jul. 2005.
"Pretreatment of Lignocellulosic Wastes to Improve Ethanol and Biogas Production: A Review", Mohammad J. Taherzadeh and Keikhosro Karimi, pp. 1621-1651, International Journal of Molecular Sciences, 2008, 9.
"Overview of biomass pretreatment for cellulosic ethanol production", Yi Zheng, Zhongli Pan, Ruihong Zhang, pp. 51-68, Int. Journal of Agricultural and Biological Engineering, vol. 2, No. 3, Sep. 2009.
"Preparation of Biodegradable Flax Shive Cellulose-based Superabsorbent Polymer Under Microwave Irradiation", Hao Feng, Jian Le and Lijuan Wang, pp. 1484-1495, peer-reviewed article, BioResources 5(3), published May 26, 2010.
"Efficient Enzymatic in Situ Saccharification of Cellulose in Aqueous-Ionic Liquid Media by Microwave Pretreatment", Li et al., pp. 4494-4504, peer-reviewed article, BioResources 6(4), published Sep. 15, 2011.
"Microwave Assisted Enzymatic Hydrolysis of Corn Stalks for L-lactic Acid Production", Yang Xue-Xin, Fang Gui-Zhen, pp. 712-715, Advanced Materials Research vols. 113-114 (2010).
"Biobased Materials", Amar K, Mohanty, Michigan State University, pp. 1-24, Presentation at Mid-Tech II, May 11, 2006.

\* cited by examiner

*Primary Examiner* — Ling Choi
*Assistant Examiner* — Ronald Grinsted
(74) *Attorney, Agent, or Firm* — Jeffrey A. Proehl; Woods, Fuller, Shultz & Smith, P.C.

(57) ABSTRACT

A system and method of producing a filler material for combining with a polymer in a product may comprise providing an initial mixture including wetted unfermented grain solids, oxidizing the initial mixture to form a treated mixture, removing moisture from the treated mixture, and combining the treated material with a polymer into a composition.

28 Claims, 11 Drawing Sheets

METHOD AND SYSTEM FOR PROCESSING UNFERMENTED GRAIN SOLIDS AND UTILIZING THE PRODUCTS THEREOF

REFERENCE TO RELATED APPLICATIONS

This application claims the benefit of U.S. Provisional Patent Application No. 61/513,918 filed Aug. 1, 2011 and U.S. Provisional Patent Application No. 61/600,760 filed Feb. 20, 2012, both of which are hereby incorporated by reference in their respective entireties.

BACKGROUND

Field

The present disclosure relates to methods for processing unfermented grain solids and more particularly pertains to new methods and systems for processing grain byproducts of ethanol production into forms highly suitable for use in compositions with polymer materials.

SUMMARY

The present disclosure is generally directed to producing a filler material with characteristics that make the material highly suitable for being incorporated into compositions with polymer materials.

In one aspect, the disclosure relates to a method of producing a filler material for combining with a polymer in a product, and may comprise providing an initial mixture including wetted unfermented grain solids, oxidizing the initial mixture to form a treated mixture, removing moisture from the treated mixture, and combining the treated material with a polymer into a composition.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the specifics of the embodiments or the particulars of the steps set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
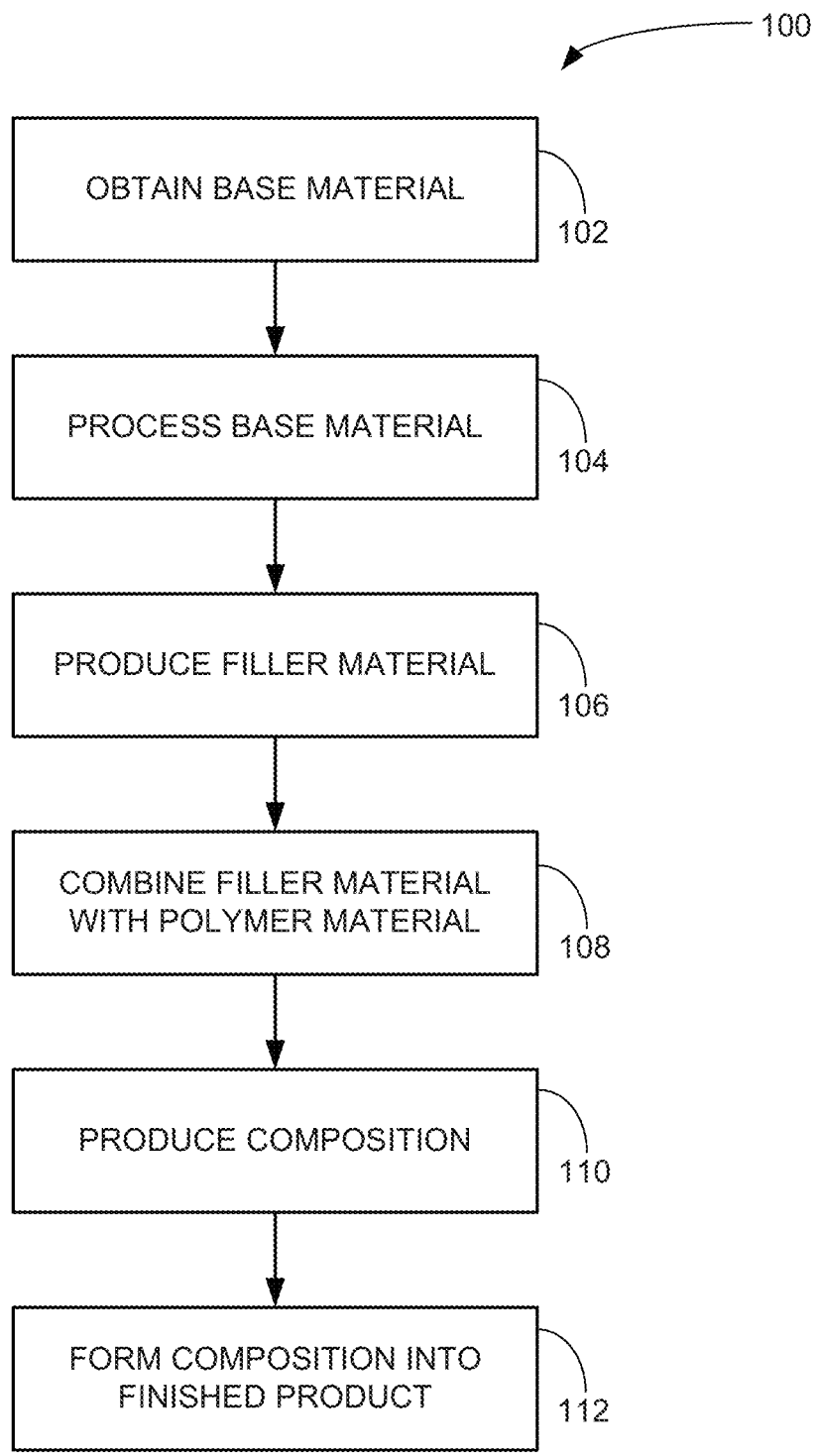
FIG. 1 is a schematic flow diagram of one implementation of the process of the disclosure.

With reference now to the drawings, and in particular to FIGS. 1 through 11, new methods and systems for processing unfermented grain solids, and utilizing the products thereof, embodying the principles and concepts of the disclosed subject matter will be described.

The disclosure is directed to producing a filler material that is highly suitable for being incorporated into compositions with polymer materials to form biopolymers. The resulting compositions may be highly suitable for forming objects through processing such as, for example, molding, extruding, and other processes often utilized for forming polymeric materials into useful items. One of the primary benefits of utilizing a filler material of the disclosure may be to reduce the cost of the final composition used to form objects by employing a filler material with a relatively lower cost than the polymer material it replaces. Other benefits or purposes may be to enhance properties of the final composition, and to "recycle" a material by giving it a new or different use, as well as providing a degree of carbon sequestration in the products that incorporate the filler material.

It is recognized that for a material to be suitable and useful for use as a filler material, there are a number of characteristics that the material should (or should not) have, at least to the greatest degree possible. In some embodiments, the filler material may be highly suitable to bond or bind to the polymer materials to a degree that tends to distinguish the filler materials of this disclosure from other filler materials that may be added to polymers. The filler materials disclosed may form compositions with polymers that have enhanced levels of many desirable characteristics. Illustratively, the polymer materials may comprise, for example, polypropylene (PP), high density polyethylene (HDPE), low density polyethylene (LDPE), polyhydroxyalkanoate (PHA) and Polylactic Acid (PLA), although other polymers may also be employed in compositions with filler materials of the present disclosure.

As the compositions are often used to form consumer products, the presentability of the filler material is a concern when the product may be used and kept in close proximity to the consumer. As one example, if the material has an offensive or disagreeable odor or smell that survives or persists in the material through the processing of the material into the composition, and through the processing of the composition into the finished product, that material is not likely to be considered to be a suitable filler material for the composition. Some aspects of the processing that are commonly used to form polymer materials into products, such as the heating that is often associated with molding, tend to increase the odor associated with compositions that include unfermented grain solids such as forms of distillers grains, and this can make the distillers grains unsuitable for incorporation into products that will be used in close proximity to the consumer of the product. Another concern is whether the use of the filler material will seriously degrade the characteristics of the composition in the product to a degree that the product may not be suitable for its intended use.

Implementations of the disclosure may permit the composition to include as much as approximately 80 percent by weight of the filler material, and even up to approximately 85 percent by weight or even up to approximately 95 percent or possibly more of the filler material, with the remainder being a polymer and various additives. The reduction in the amount of polymer material utilized in the composition may thus be significant and thus the cost of the composition may be significantly decreased, as well as providing other benefits. Even at such high relative concentrations of the filler material in the composition, the composition performs well in processing, including, for example, extrusion and pelletizing processes.

The filler material may be produced by a process or processes disclosed herein using one or more types of input or base materials that are used as a base or starting material for the disclosed processes. The processes may utilize base materials that are byproducts or co-products of another process and may have a lower relative cost than the polymer material that it replaces in the composition. In some highly preferred implementations, the base materials are byproducts or co-products of the production of ethanol from grains such as corn. Such ethanol production produces byproducts that may have various forms that may be useful in various implementations of the processes of this disclosure to produce a suitable filler material. The ethanol production byproducts may include unfermented grain solids, or residues from the grains used in the ethanol production process that may not have been fermented in the production process, as well as moisture that is associated with the process, as well as other residual substances. The ethanol production byproducts may thus include protein, fiber, fats or oils, and moisture components.

Figure 7:
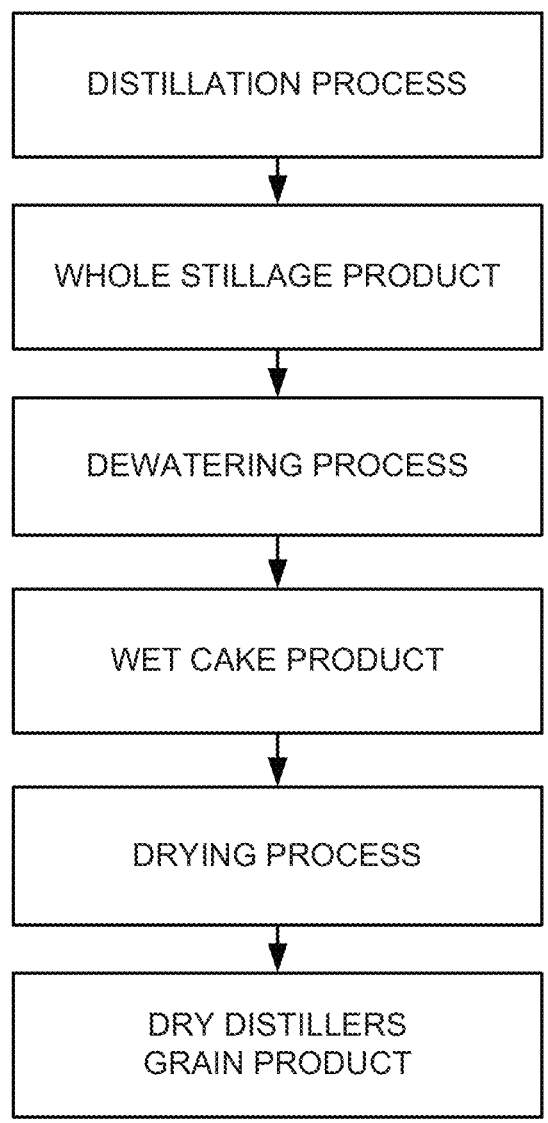
FIG. 7 is a schematic flow diagram of an illustrative relationship between different ethanol production byproducts.

Looking to FIG. 7, the ethanol production process produces various byproduct materials that may be distinguished in different ways, such as the amount of processing applied to the materials resulting from the ethanol production or the amount of moisture present in the material. Illustratively, whole stillage is one byproduct material produced by the ethanol production process that may be utilized for the processes of the disclosure. Whole stillage useful in the processes may include solids by weight in the range of approximately 1 percent to approximately 45 percent, and some of the most preferred implementations may utilize whole stillage with approximately 12 percent solids by weight. The balance of the whole stillage by weight may be moisture. A degree of dewatering applied to the whole stillage byproduct material may produce wet distillers grains (WDG), sometimes referred to as "wet cake." WDG that may be useful in the processes of the disclosure may include moisture by weight in the range of approximately 25 percent to approximately 85 percent, and some of the most preferred implementations may utilize WDG with approximately 65 percent moisture by weight. Further drying of the WDG product may produce dry distillers grain (DDG). DDG that may be useful in the processes of the disclosure may include moisture by weight in the range of approximately 0 percent to approximately 25 percent, and some of the most preferred implementations may utilize DDG with approximately 10 percent moisture by weight. In some cases, the "solubles" resulting from the ethanol production process may be added back into the WDG or DDG products. Generally, the ethanol production byproducts may be differentiated by the amount of moisture present, and suitability of the different forms of the byproducts for the disclosed processes may depend upon the need to transport the base material between facilities, and the economics of transporting a material with a high moisture content for significant distances.

Considering in greater detail the ethanol production byproduct materials useful as a base material for the disclosed processes, whole stillage is the byproduct material of the fermentation process after distillation has removed the alcohol (such as ethanol) but generally before any further processing to remove, for example, moisture to produce WDG. Use of the whole stillage may be highly preferred for some implementations of the disclosed processes, as some of the cost and time associated with the drying techniques utilized to reduce the moisture content may be avoided. Further, the drying processes that employ heat to reduce the moisture content of the whole stillage down to the levels present in WDGs and DDGs may be detrimental to the characteristics of the base material for the purposes of the disclosed processes, and the resulting filler material as well as compositions including the filler material may be compromised. For example, heating of the solids in the stillage to remove moisture may denature proteins that are contained in the base material and inhibit the ability to modify hydrophilic side groups such as $-NH_2$, $-OH$, $-COOH$, and $-SH$ using the processes of the disclosure. Also, the presence of a higher degree of moisture in the whole stillage as compared to WDGs and DDGs may avoid having to add moisture back into the base material to facilitate steps of the process. Moreover, it will be recognized that the removal of moisture from the whole stillage to produce WDG or DDG and the subsequent reintroduction of moisture to the WDG or DDG product for the disclosed processes may result in wasted time and energy.

While some attempts or proposals have been made to utilize DDG as a filler material with polymer materials to form compositions, the results are believed to have raised concerns about the mechanical properties, thermostability, and undesirable or offensive odor of such compositions incorporating the DDG. The applicant has developed novel processes that allow for the use of various byproduct materials of the ethanol production process in a composition with polymer materials that significantly reduces undesirable properties, such as the unpleasant and undesirable odor in the distillers grains, and thus facilitates the use of the ethanol byproduct materials as a base material to produce a highly suitable filler material. The applicant has recognized that the processes are particularly effective when employed with whole stillage and WDGs, thus avoiding the time and energy that would otherwise need to be expended to remove moisture to produce a DDG product when the moisture can be utilized in the processing. Additional benefits of the method of processing the base material into the filler material, which carry over into enhancements of the material properties of the compositions, include increased tensile strength and increased impact resistance of the composition as compared to other fillers, as well as enhancing properties that facilitate the molding of the composition, particularly when compared to filler materials utilizing DDG products not having been treated by the disclosed process.

The processes of this disclosure have particular value in the utilization of the residual byproduct materials of ethanol production. The composition of the residual byproduct materials, such as the aforementioned whole stillage, WDG and DDG typically include components such as protein, fiber, fats or oils, and moisture, and the presence and levels of these components in the ethanol byproduct materials will often vary from one ethanol production plant to another plant, and even from the production of one day to another day at the same plant. Generally, the process has the benefit of reducing the amount of fats and oils in the resulting filler material which tends to increase (on a relative basis) the amount of proteins and fibers in the filler material. This reduction in fats and oils is believed to help in the reduction of odors that may otherwise be present in a filler material utilizing ethanol byproduct materials.

It should be recognized that the base material utilized in the process may be different or modified from what may conventionally be referred to by the terms whole stillage, WDG, and DDG. For example, in some implementations of the process, the WDGs utilized may not include the "solubles" produced by the ethanol production process that are sometimes added to the wet or dry forms of the distillers grains. Some constituents of the "solubles" may contribute an unpleasant odor to the filler material. At least partially as a result, while typical WDG with the solubles will contain approximately 10% oil by weight, some byproduct materials without the solubles may be used having an oil content of approximately 1% to approximately 3% oil by weight. In some implementations, such as those utilizing whole stillage as the base material, the fat and oil content may be greater, such as up to approximately 15 percent or more by weight. The disclosed processes tend to modify or remove fats and oils that may contribute to the smell of the filler material so that the odor of the material is not unpleasant, particularly after being included in the composition with the polymer material and heated and formed into the final product.

In a general sense, as shown in FIG. 1, a process 100 of the disclosure may include steps of obtaining a base material (block 102), processing the base material (block 104), producing the filler material (block 106), combining the filler material with a polymer (block 108), producing a composition that includes the filler material and the polymer (block 110), and forming a finished product using the composition (block 112). Some steps of the process may be performed at different locations and by different agents or entities, and some implementations may only include some portions of the process outlined here.

Figure 2:
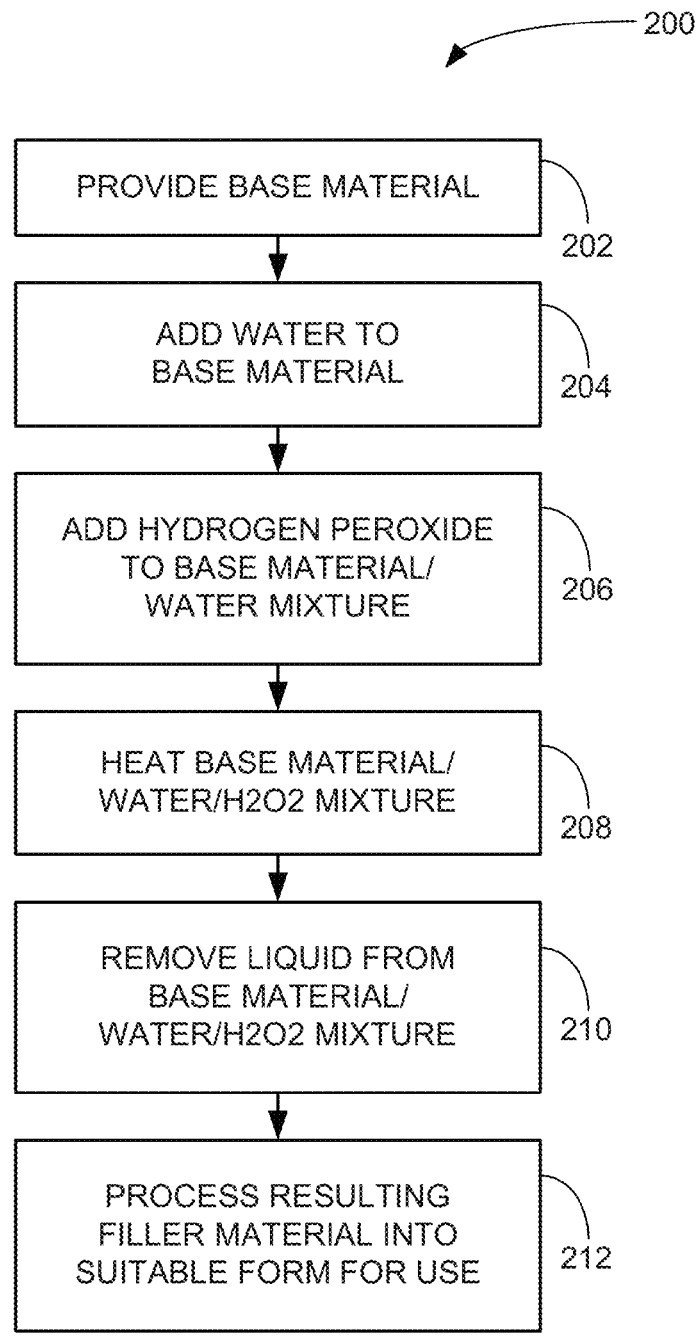
FIG. 2 is a schematic flow diagram of steps of an implementation of the process of FIG. 1 depicted in greater detail.

In a somewhat more detailed illustration of the disclosure that is shown in FIG. 2, a process 200 involves providing a quantity of the base material (block 202), and adding a quantity of water to a quantity of the base material (block 204) such that an initial mixture of wetted unfermented grain solids is provided. In some implementations, the process may include determining if the fermentation byproduct for the base material has a moisture content of at least approximately 5 percent. The quantity of water added to the base material may be dependent upon achieving a suitable concentration of an oxidizer in the mixture of base material and moisture (moisture either in the base material or added to the base material). Thus the moisture content already present in the base material can increase or decrease the amount of water that may need to be mixed with the base material to achieve the concentration of the oxidizer desired, and in some cases no water may need to be added to achieve the desired concentration due to the moisture already present in the base material. Therefore, in implementations where the base material is WDG, the amount of moisture in the WDG may vary significantly from one batch quantity of WDGs to another batch quantity, so the amount of water added may need to be continuously varied from batch to batch. In implementations of the process that utilize whole stillage, or another relatively high moisture content base material, the moisture content in the base material may be sufficient to perform the process and no water may need to be added to the base material to perform the steps of the process, such as the treatment with the oxidizer. This situation may be advantageous in that preliminary moisture removal, such as by centrifuge at the ethanol production facility, may be avoided as well as the time and cost associated with the moisture removal. Through the addition of water to the base material (or through no addition of water due to the moisture content of the base material), some of the most preferred implementations of the process may utilize a mixture with a solids content of approximately 12% to approximately 50% by weight prior to the addition of other substances to the base material and water mixture.

The process further involves the addition of an oxidizer to the mixture of the base material and water, or the base material alone if the base material had sufficient moisture content and no water has been added (block 206). In some of the most preferred implementations, the oxidizer may comprise hydrogen peroxide ($H_2O_2$), although other oxidizing agents may be utilized, including (but not limited to) chlorates, peroxides, persulfates, perchlorates, permanginates, and hypochlorates, such as, for example, potassium chlorate, benzoyl peroxide, potassium persulfate, barium perchlorate, potassium permanganate, sodium hypochlorite as well as other oxidizing substances. Hydrogen peroxide may be a less active oxidizer than some other oxidizers, but has advantages in that it more readily available and less regulated than some other oxidizers. The strength or concentration of the hydrogen peroxide solution employed may vary. The concentration of the hydrogen peroxide utilized may vary, and may vary widely, as concentrations up to 35% or more have been successfully utilized to achieve the desired results. The oxidizer may be introduced to the base material with the water added to the base material such that there are not two distinct or separate steps in adding water and adding the oxidizer.

Significant to the process, and the step of adding the oxidizer, is achieving a suitable concentration of the oxidizer in the mixture of base material, moisture or water, and the oxidizer. Thus the amount of oxidizer added to the base material and moisture or water mixture may be governed by achieving a suitable concentration of the oxidizer in the resulting mixture. Concentrations of hydrogen peroxide that have been found suitable for use in the process may range from approximately 0.25 percent to approximately 6 percent, and more highly suitable concentrations may range from approximately 1.5 percent to approximately 3 percent, and one highly suitable concentration is approximately 2.25 percent. It has been found that use of concentrations lower than approximately 0.25 percent are barely effective, and use of concentrations above approximately 6 percent have exhibited signs of making problems such as odor worse. Also, sufficient moisture needs to be present to allow the hydrogen peroxide to be sufficiently mobile to reach and act on the solids of the base material.

The time of exposure of the oxidizer to the base material and water may be referred to as residence time and may be measured from about the time of the addition of the oxidizer to the mixture to about the time that further processing steps are taken that would tend to remove one of the components, such as removal of the moisture. During this time, the mixture may be heated and mixed or agitated to enhance the activity by the oxidizer on the base material. This time period may in some implementations suitably range from approximately 1 minute to approximately 24 hours, and more suitably ranges from approximately 15 minutes to approximately 1 hour, and highly preferably is approximately 30 minutes In a further portion of the process, the mixture of base material, water and hydrogen peroxide is heated for a period of time (block 208) to facilitate the action of the oxidizer on the other components of the mixture. The heating of the mixture may generally coincide or correspond to the time that the oxidizer is allowed to interact with the base material prior to further steps of the process, and may occur with mixing of the base material, water and hydrogen peroxide, although this is not necessary. The degree to which the mixture is heated, and the period of time over which the mixture is heated, may depend in part upon the amount of moisture in the mixture, although the heating is not necessarily intended to remove a significant amount of the moisture from the mixture. In some implementations, the heating of the mixture is conducted utilizing apparatus suitable to heat the mixture, and may be performed at a temperature that is in the range of approximately 25 degrees C. to approximately 100 degrees C., and in some of the more preferred implementations the temperature is in the range of approximately 75 C to approximately 90 C, and in some of the most preferred implementations the temperature is approximately 82 C. It should be recognized that in some implementations, the temperature of the base material may facilitate the heating of the treated mixture, particularly if the base material is being utilized for the process relatively soon after the base material has been removed from the ethanol production process and retains some of the heat from that process, which may occur where some parts of the disclosed process is being performed in the ethanol production facility.

In a step of the process that may be conducted after the residence time has passed and the heating has be performed, the solid components of the mixture may be separated from the liquid components by removing the liquid or moisture from the treated mixture (block 210). This removal may be performed in any suitable manner, and in some preferred implementations of the process, the removal is performed in a multiple step process using, for example, separation of liquid from the solids of the mixture using, for example, a centrifuge, and then using heat to remove residual moisture from the solids taken from the centrifuge. In greater detail, the treated mixture is placed in a centrifuge to separate the solids components from the liquid components, and then the liquid components may be decanted or otherwise removed from the solid components. In some implementations of the process, the force applied to the mixture in the centrifuge may be in the range of approximately 2000 times the force of gravity to approximately 7800 times the force of gravity. The centrifuge may be applied to the mixture for a period of time of approximately 20 minutes, although greater or lesser periods of time may be utilized.

Additional removal of liquid and drying of the mixture may be conducted to produce a substantially dry product, and may be accomplished by heating of the mixture. The heat drying of the mixture may be accomplished by any suitable manner and apparatus, but is suitably accomplished using convection heating, microwave heating, or a combination of convection and microwave heating. In some implementations of the process, heating may be accomplished in two stages with a first stage utilizing convection heating of the mixture to remove moisture and bring the moisture content down to a first level, and then heating of the mixture may be continued using microwave heating to remove additional moisture and bring the moisture content down to a second level. For example, initial convection heating may be utilized to remove moisture and bring the moisture content down to approximately 15 percent moisture by weight, and then microwave heating may remove moisture and bring the moisture content down to approximately 1 percent to approximately 3 percent by weight.

For example, microwave energy at frequencies of approximately 902 MHz to approximately 920 MHz may be used, with an energy density of approximately 300 watts to approximately 500 watts per pound of water, although other energy frequencies and power density levels may be employed. In one preferred implementation, a frequency of approximately 915 MHz and an energy density of approximately 380 watts per pound of water may be employed. Heating the mixture through the use of microwave energy may provide relatively greater benefits for the process than convection heating, or convection heating alone. The use of microwave drying may help to break down at least some of the cellulose contained in the mixture to create additional sites on the filler material to which the polymer material may bond. The microwave drying may also increase the ability of the cellulose to melt in the composition, and may enhance the ability to interact with a polyethylene glycol (PEG) additive to make the composition more mobile.

The filler material, after being dried to a suitable degree, may be further processed into a physical form that is suitable for mixing into a composition with a polymer (block 212). This further processing may include milling the filler material into a form that is suitable for mixing or compounding with a polymer, and may include forming the filler material into a form which passes through a #100 mesh. However, other forms may also be suitable.

Figure 3:
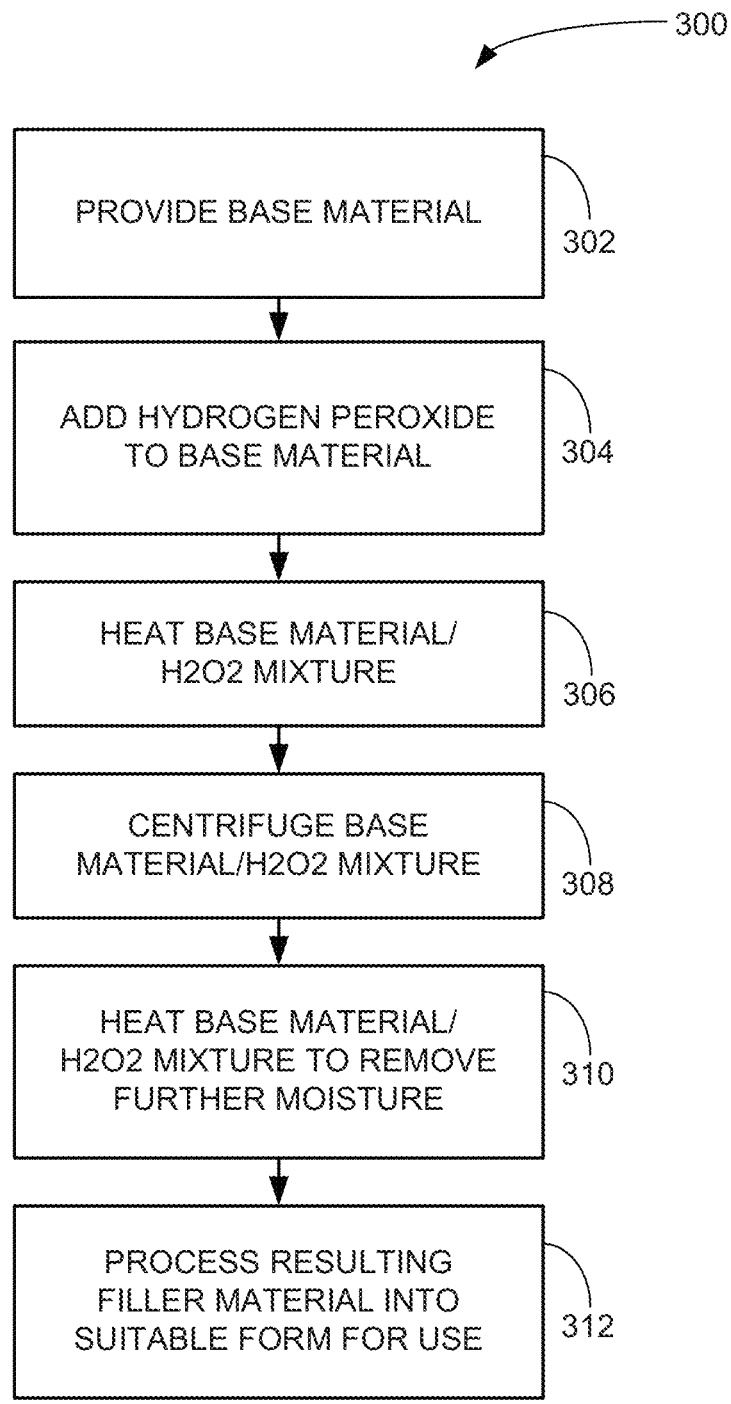
FIG. 3 is a schematic flow diagram of steps of another implementation of the process of FIG. 1 depicted in greater detail.

As illustrated in FIG. 3, a process 300 may be utilized in which there is no addition of water as a step in the process, which may be suitable in implementations where the base material is provided with a high moisture content level and further moisture is not required to facilitate the treatment. The base material may be obtained (block 302), usually with a relatively high moisture content, and the oxidizer, such as hydrogen peroxide, may be added to the base material (block 304). The mixture of the base material and oxidizer may be heated (block 306) for a period, and moisture may be removed from the mixture through, for example, the use of a centrifuge (block 308). The mixture may be heated to remove further moisture from the mixture (block 310), and additional processing may be performed on the dried mixture to provide a physical form that is suitable for combining with a polymer (block 312), such as milling of the material to a suitable particle size.

Figure 4:
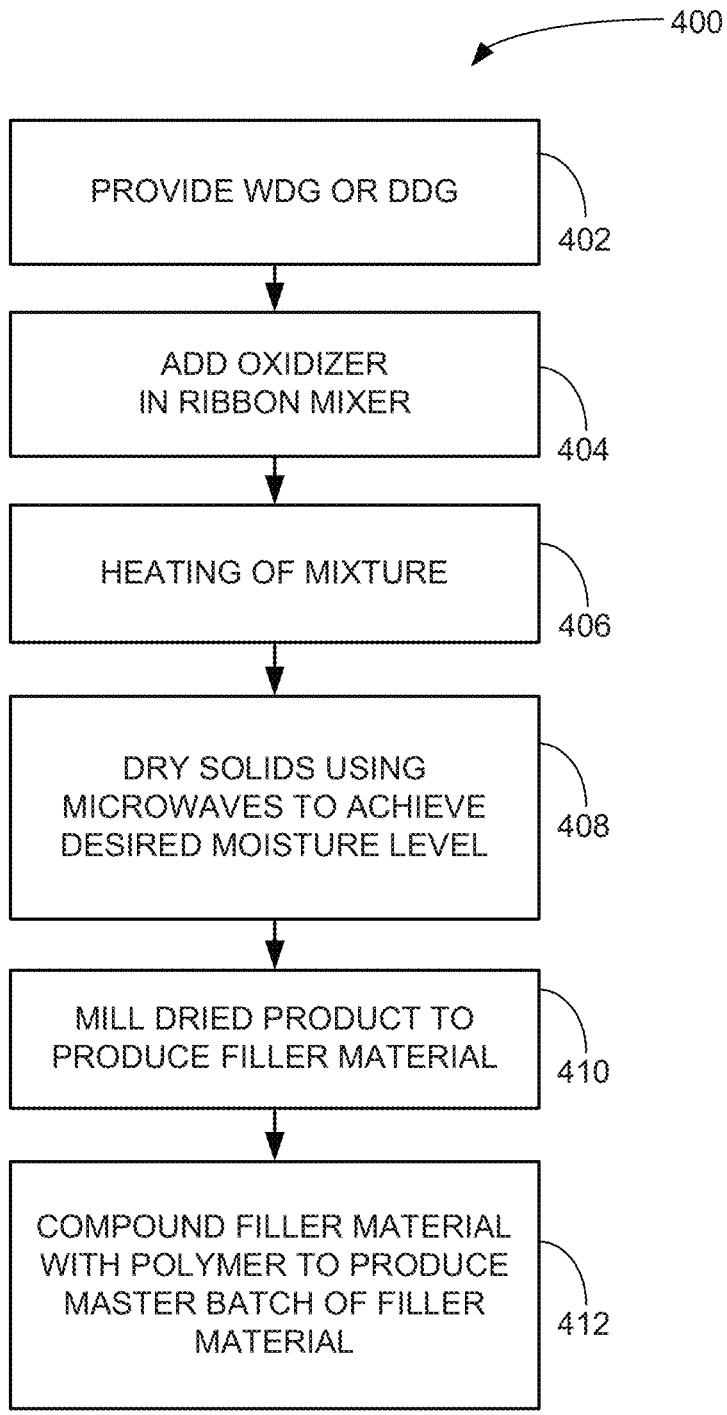
FIG. 4 is a schematic flow diagram of an exemplary implementation of a process of the disclosure.

Another illustrative process 400 is depicted in FIG. 4 in which a base material is provided (block 402), and the base material is mixed with an oxidizer (such as $H_2O_2$) in a mixer such as a ribbon mixer (block 404). The mixture may be heated during and/or after mixing (block 406) to facilitate the action of the oxidizer on the base material, and in implementations in which the moisture content is relatively low, the resulting mixture may be dried, such as in a microwave oven, to approximately 1 percent to approximately 3 percent moisture (block 408).

Significantly, the resulting filler material may be compounded with a polymer to form a master batch of the composition. Preferably, although not necessarily, the master batch may have a content of filler material that is relatively higher as a percentage than the percentage that may be used in a final composition used to form a final or finished product. Advantageously, the master batch may then be transported to a different location where the final product is to be formed, such as a manufacturing facility for the finished product. Additional polymer may be added to material taken from the master batch in a quantity required to achieve the desired final composition mixture ratio of filler material to polymer to achieve the characteristics required in the finished product. It is contemplated that the content of the filler material in most implementations of the master batch may range from approximately 1 percent to approximately 85 percent by weight, with the balance comprising polymer and in some implementations additives. It is further contemplated that the filler material content of the master batch may be at least 60 percent, and in some further implementations the filler material content may be approximately 75 percent. In implementations of the disclosure, after the additional polymer (as well any additives) is added, the final composition may have a filler material content of approximately 5 percent to approximately 40 percent, and in some implementations may be at least approximately 60 percent, and in some further implementations may be approximately 20 percent. In one illustrative implementation, the filler material content is approximately 75 percent, the polymer content is approximately 21 percent, and the additive content is approximately 4 percent (by weight). The end user may then add additional polymer to the master batch to achieve a final filler material content of approximately 5 percent to approximately 40 percent to for the final product although other ratios may be used in the final product.

In implementations in which the disclosed processes are performed in a facility located a distance away from the ethanol production facility, the utilization of WDG or DDG base materials (or other relatively lower moisture level forms) may be advantageous for the reason that the relatively lower moisture content of WDG and DDG materials generally permits easier and less expensive to transport than higher moisture content forms, such as whole stillage. However, the use of WDG and DDG products as base materials for the process may in many cases require the addition of moisture (e.g., water) to the base materials as a part of conducting the processes of the disclosure.

Some highly advantageous implementations of the processes may advantageously have some or all parts or steps of the process being performed at different locations, such as performing initial steps at the ethanol production facility, with any remaining steps being performed at another facility that may be relatively remote from the ethanol production facility. Such implementations may be advantageous in that, for example, the time and expense of removing moisture from the base material in order to more economically transport the material may be avoided, and the moisture in the base material from the ethanol production may be utilized in the disclosed process. These implementations may have several advantages. Equipment that is often present in the ethanol production facility for the processing of whole stillage, WDG and DDG, may also be utilized to produce an intermediate or a finished form of the filler product on the production facility site. For example, equipment that is utilized to process whole stillage into WDG, or WDG into DDG, such as centrifuges, may be utilized for performing steps of the disclosed process. Such proximity and sharing of equipment may avoid the need to add moisture to the base material for performing steps of the process, allow disposal of moisture in the ethanol production facility using the facility's disposal permits, and reducing the bulk of the material that needs to be transported from the production facility to other locations for further processing and use of the material.

Figure 5:
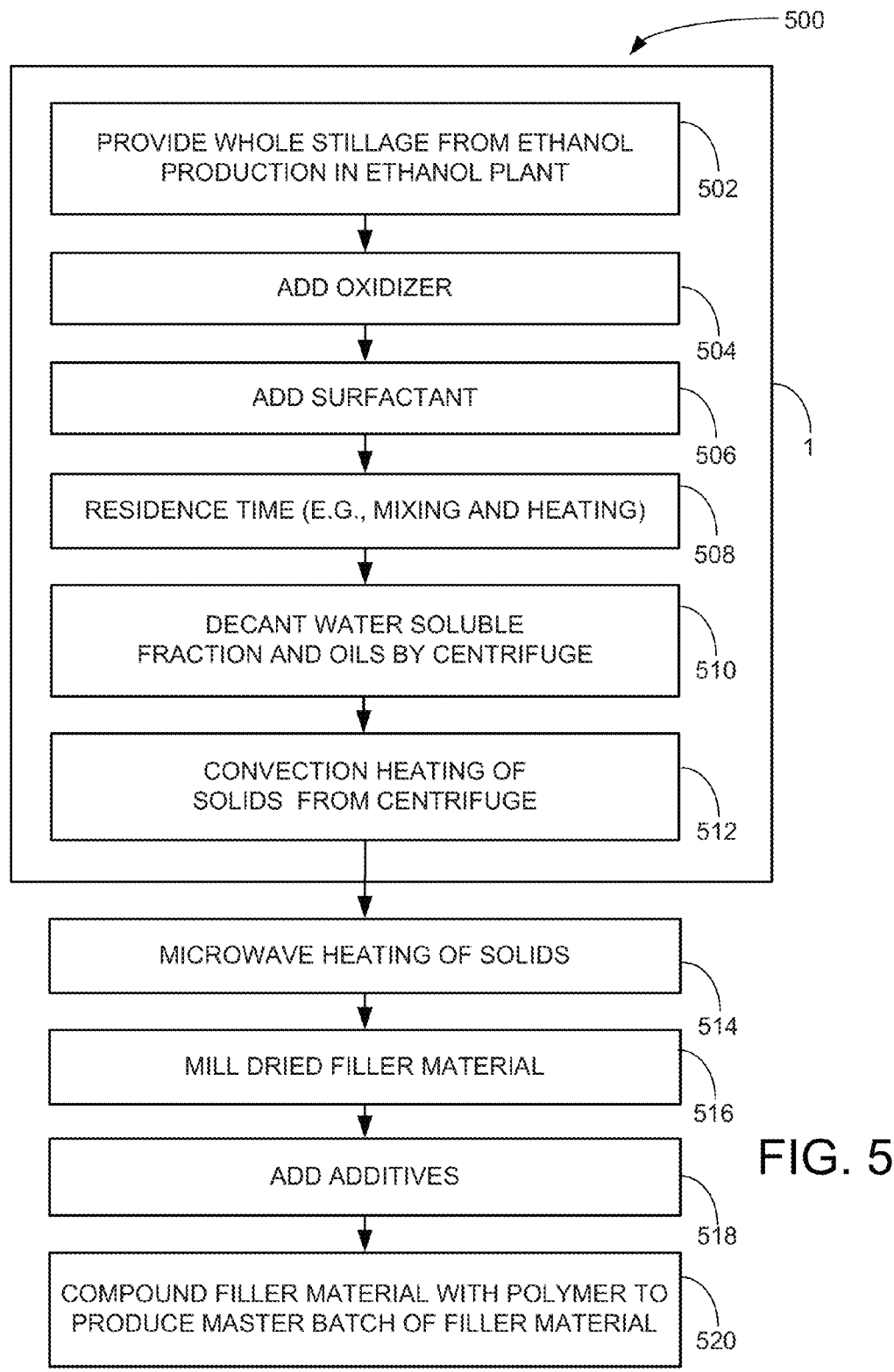
FIG. 5 is a schematic flow diagram of another exemplary implementation of a process of the disclosure in which at least a portion of the process is conducted in an ethanol production plant.

A process 500 illustrative of this ethanol production facility processing is shown in FIG. 5 of the drawings. The whole stillage material may be taken from the ethanol production process, and rather than further processing the stillage to become WDG or DDG, or otherwise shipping the stillage to another location for further processing, aspects of the disclosed processes may be employed in the facility 1 on the stillage (or other form including unfermented grain solids). The base material may have an elevated temperature as a result of the ethanol production process that may be beneficial to the operation of the disclosed processes, such by reducing or eliminating the heating utilized in the process. The base material, illustratively whole stillage (block 502), may be treated by adding an oxidizer such as hydrogen peroxide ($H_2O_2$) (block 504) in the production plant. After the addition of the oxidizer, the resulting mixture may be permitted to interact for a period of time to allow the oxidizer to act on the base material. A surfactant may be added to the mixture of base material and oxidizer (block 506) to facilitate the interaction between the base material and the oxidizer. After the desired residence time has elapsed, the mixture may be moved to a centrifuge apparatus to remove moisture from the mixture (block 508). Advantageously, many ethanol production plants have centrifuge apparatus normally used to process the residual products of the ethanol production process, and may be used for the disclosed process. The centrifuge removes much of the water soluble fraction and oils from the mixture. Further moisture removal may be accomplished by heating the mixture (block 512) to bring the moisture content down to a lower level, such as approximately 10%, using apparatus such as a convection oven. In some implementations, the mixture may be moved from the ethanol production plant after this step is completed to another facility for further processing, although in other implementations the movement may occur earlier or later in the process. The further processing may include, for example, the removal of additional moisture from the mixture and may include further heating of the mixture (block 514) such as by microwave heating. The further heating may be performed by applying microwave energy to the mixture to bring the moisture down to a lower level, such as for example approximately 1 percent to approximately 3 percent moisture by weight. The resulting substantially dry solids may be processed into a physical form that is more suitable for further processing, including milling the solids into a desirable form (block 516). The filler material may then be treated with any additives that are desired, such as additives that tend to scavenge moisture from the filler material when combined with the filler material. Such additives may include, for example, acids, bases, chain extenders, compatiblizers, waxes, anti-oxidants as well as other substances (block 518). The filler material may then be mixed with a quantity of a polymer to produce a master batch (block 520) to be utilized for forming a finished product.

Figure 6:
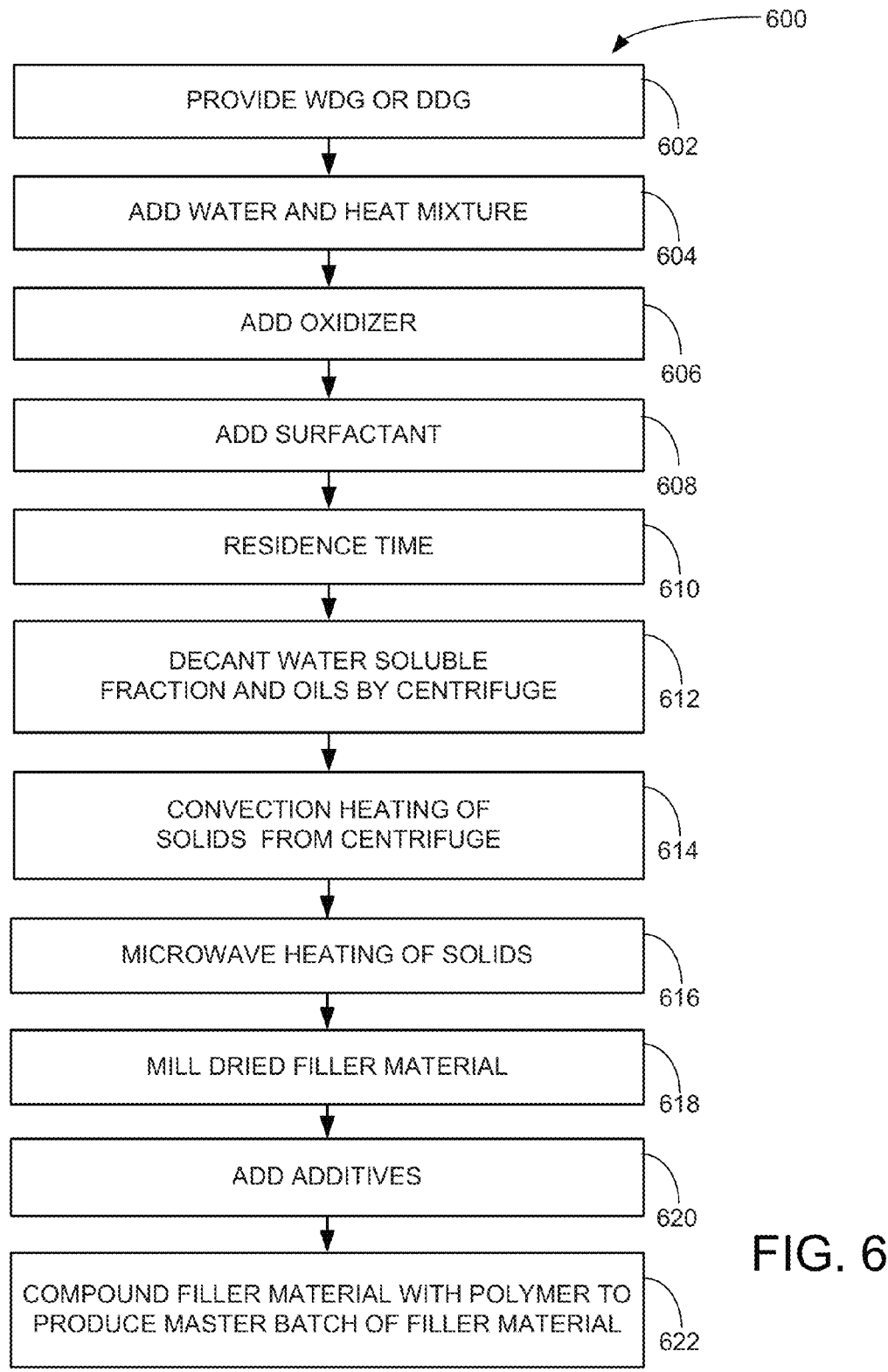
FIG. 6 is a schematic flow diagram of still another exemplary implementation of a process of the disclosure.

Another illustrative implementation is shown in FIG. 6, in which the process 600 includes providing a base material, such as WDG or DDG (block 602) and adding water and heating the resulting mixture (block 504). The oxidizer is added to the mixture (block 606) and a surfactant may also be added (block 608), and the mixture may be allowed to interact, at which time the mixture may continue to be mixed (block 610). After a period of time, moisture may be decanted from the mixture using, for example, a centrifuge (block 612). Following the decantation, the mixture may be heated by convection to remove moisture (block 614), and then further heated using microwave energy to remove additional moisture (block 616). The dried filler material may be milled into a more suitable form (block 618) and any desired additives may be added to the mixture (block 620). The filler material may be compounded with polymer to form a master batch of the compound that may be provided to end users of the compound to form finished products.

Several examples are provided below to illustrate aspects of the disclosure.

Example 1

In an illustrative example, approximately 1000 g of DDG was treated with 2000 ml of $H_2O_2$ at 3 percent dilution and heated to 50 degrees C. for approximately 24 hours. The resulting mixture was centrifuged for approximately 10 minutes at 1725 times the force of gravity and the liquid phase was decanted, and the resulting solids were dried for approximately 24 hours at approximately 80 degrees C. in a convection oven. The product was milled to a 100 mesh size. The above formulation was twin screw compounded at a content of approximately 75 percent filler material and approximately 25 percent polymer and additives and formed into a pellet. The composition was subsequently compounded with additional polymer such that a final composition with a content of approximately 20 percent of the filler material was achieved, and was subjected to mechanical testing. The final composition exhibited a tensile modulus of approximately 150,000 psi, a tensile strength of approximately 2170 psi and a notched impact strength of approximately 0.72 ft-lb/in.

Example 2

In another illustrative example, approximately 1000 g of WDG was mixed with 1500 ml of $H_2O_2$ at 3% dilution and heated to 50 degrees C. for approximately 24 hours. The resulting mixture was centrifuged for approximately 10 minutes at 1725 times the force of gravity and the liquid phase was decanted, and the resulting solids were dried for approximately 24 hours at approximately 80 degrees C. in a convection oven. The product was milled to a 100 mesh size. The above formulation was twin screw compounded at a content of approximately 75 percent filler material and approximately 25% polymer and additives and formed into a pellet. The pelletized composition was then further compounded with additional polymer to achieve a composition with approximately 20 percent of the filler material. Mechanical testing of the final composition demonstrated a tensile modulus of approximately 142,000 psi, a tensile strength of approximately 2140 psi and a notched impact strength of approximately 0.59 ft-lb/in.

Example 3

In yet another illustrative example, approximately 1000 g of DDG was mixed with approximately 2000 ml of $H_2O$ and 70 g of $H_2O_2$ at 35% dilution and heated to 65 degrees C. for approximately 1 hour. The resulting mixture was centrifuged for approximately 10 minutes at 1725 times the force of gravity and the liquid phase was decanted, and the resulting solids were dried for approximately 24 hours at approximately 80 degrees C. in a convection oven. The product was milled to a 100 mesh size. The filler material was twin screw compounded at a content of approximately 75 percent filler material and approximately 25 percent polymer and additives and formed into a pellet. The composition was subsequently compounded with additional polymer such that a final composition with a content of approximately 20 percent of the filler material was achieved, and was subjected to mechanical testing. The final composition exhibited a tensile modulus of approximately 145,000 psi, a tensile strength of approximately 2210 psi and a notched impact strength of approximately 0.61 ft-lb/in.

Example 4

In still another illustrative example, approximately 1000 g of DDG was mixed with approximately 2000 ml of $H_2O$ and 140 g of $H_2O_2$ at 35% dilution and heated to 65 degrees C. for approximately 1 hour. The resulting mixture was centrifuged for approximately 10 minutes at 1725 times the force of gravity and the liquid phase was decanted, and the resulting solids were dried for approximately 24 hours at approximately 80 degrees C. in a convection oven. The product was milled to a 100 mesh size. The above formulation was twin screw compounded at a content of approximately 75 percent filler material and approximately 25 percent polymer and additives and formed into a pellet. The composition was subsequently compounded with additional polymer such that a final composition with a content of approximately 20 percent of the filler material was achieved, and was subjected to mechanical testing. The final composition exhibited a tensile modulus of approximately 145,000 psi, a tensile strength of approximately 2210 psi and a notched impact strength of approximately 0.71 ft-lb/in.

Example 5

In another illustrative example, approximately 1000 g of DDG was mixed with approximately 2000 ml of $H_2O$ and 35 g of $H_2O_2$ at 35% dilution and heated to 65 degrees C. for approximately 1 hour. The resulting mixture was centrifuged for approximately 10 minutes at 1725 times the force of gravity and the liquid phase was decanted, and the resulting solids were dried for approximately 24 hours at approximately 80 degrees C. in a convection oven. The product was milled to a 100 mesh size. The resulting filler material was twin screw compounded at a content of approximately 75 percent filler material and approximately 25 percent polymer and additives and formed into a pellet. The composition was subsequently compounded with additional polymer such that a final composition with a content of approximately 20 percent of the filler material was achieved, and was subjected to mechanical testing. The final composition exhibited a tensile modulus of approximately 148,000 psi, a tensile strength of approximately 2190 psi and a notched impact strength of approximately 0.73 ft-lb/in.

Example 6

In a further illustrative example, approximately 1000 g of DDG was mixed with approximately 2000 ml of $H_2O$ and 35 g of $H_2O_2$ at 35% dilution and heated to 55 degrees C. for approximately 1 hour. The resulting mixture was centrifuged for approximately 10 minutes at 1725 times the force of gravity and the liquid phase was decanted. The resulting solids were dried at approximately 80 degrees C. in a convection oven to approximately 15% moisture content, and then further dried in a microwave oven to 3% moisture content. The product was milled to a 100 mesh size. The above formulation was twin screw compounded at a content of approximately 75 percent filler material and approximately 25 percent polymer and additives and formed into a pellet. The composition was subsequently compounded with additional polymer such that a final composition with a content of approximately 20 percent of the filler material was achieved, and was subjected to mechanical testing. The final composition exhibited a tensile modulus of approximately 147,000 psi, a tensile strength of approximately 2200 psi and a notched impact strength of approximately 0.74 ft-lb/in.

Example 7

In another illustrative example, approximately 1000 g of WDG was mixed with approximately 58 g of $H_2O_2$ at 35% dilution and heated to 55 degrees C. for approximately 1 hour. The resulting mixture was centrifuged for approximately 10 minutes at 1725 times the force of gravity and the liquid phase was decanted. The resulting solids were dried at approximately 80 degrees C. in a convection oven to approximately 15% moisture content, and then further dried in a microwave oven to 3% moisture content. The product was milled to a 100 mesh size. The material was twin screw compounded at a 75% composition of material with 25% polymer and additives to yield a pellet that was let down to a lower material content of 20% for mechanical testing with the following results. A tensile modulus of 142,000 psi, a tensile strength of 2130 psi and notched impact strength of 0.68 ft-lb/in.

Advantageously, the use of the oxidizer treatment substantially reduces the unpleasant or acrid odor associated with the use of the filler material in compositions with polymer materials, particularly in comparison to compositions that utilize untreated unfermented grain solids such as DDGs. Compositions with DDG and a polymer tend to develop or intensify an unpleasant odor when exposed to the heating required for molding the composition into a useable item. The disclosed process may reduce such odors by removing or modifying the solubles or soluble portion or fraction of the base material that tends to give the base material the unpleasant odor when heated, and that also tends to carry through to the filler material if the disclosed treatment were not employed. The removal of the solubles from the base material may also help to minimize the occurrence of an objectionable coating that may form on metal surfaces of molds during the processing of compositions that include the filler material. The treatment may oxidize components of the base material, such as oils, to decrease the potential for unpleasant odor and make these components more active for bonding with the polymer in the final composition. The use of the oxidizer treatment may modify hydrophilic side groups, such as $-NH_2$, $-OH$, $-COOH$, and SH on proteins such as zein in the base material, which may increase strength of the filler material. The hydrophilic character of the filler material may be reduced as a result. The oxidizer treatment may also modify fatty acids in the base material, and the modified fatty acids may act as plasticizers in the composition of the polymer and filler material. The oxidizer treatment may also break down and/or remove lignin in the base material, which can reduce the odor of the filler material and make the filler material more readily processed. The use of the hydrogen peroxide treatment may also decrease the free acetic acid in the mixture to further reduce unpleasant odor of the filler material. Further, it is believed that the treatment process removes or neutralizes odors produced by Diferuloylputrescine, a compound in the zein in the grain.

Figure 8:
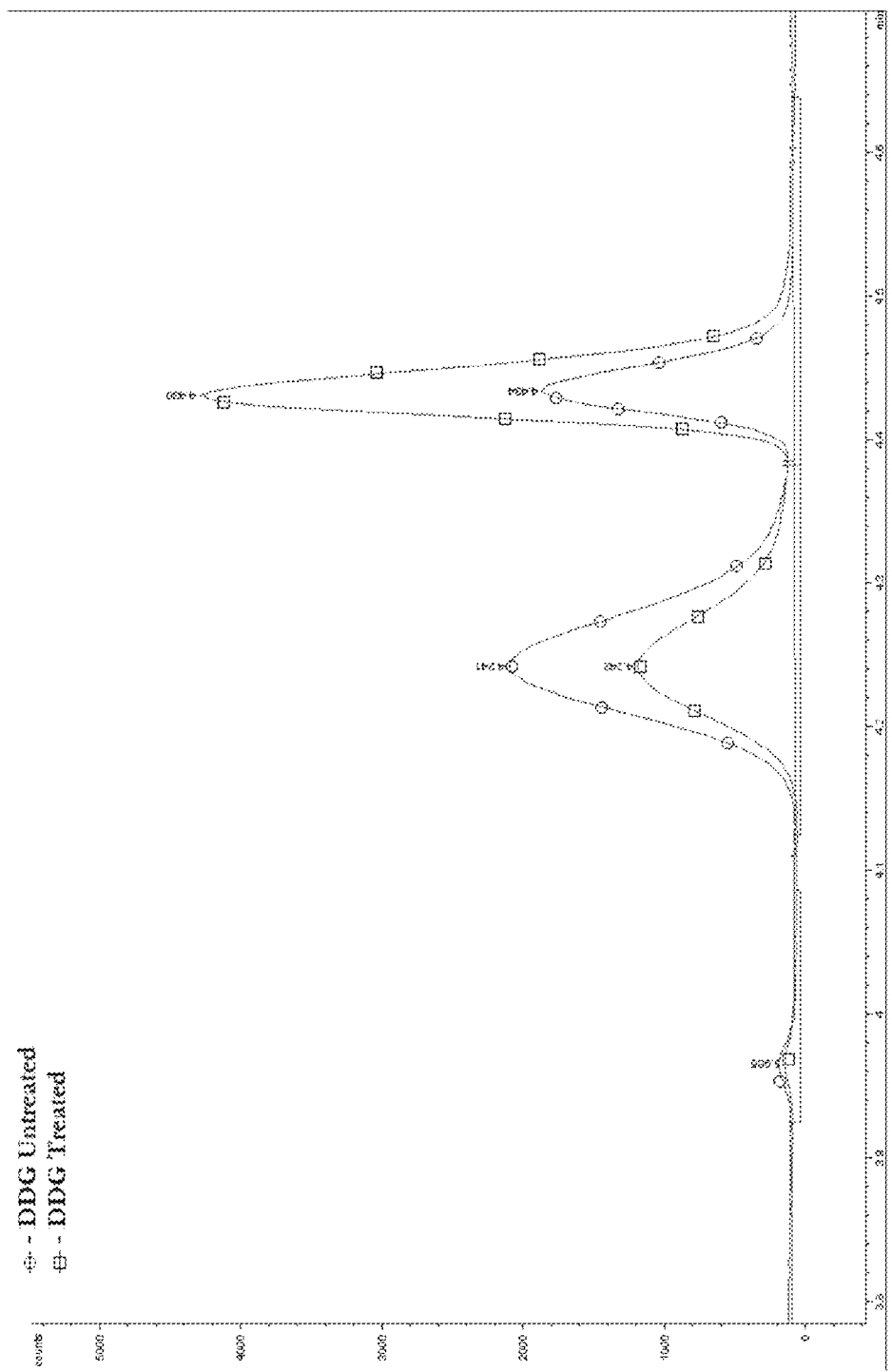
FIG. 8 is a schematic graph of a gas chromatography assay of an untreated DDG sample and a DDG sample treated according to aspects of the disclosed process.

FIG. 8 of the drawings shows a partial graph of a gas chromatography assay of an untreated DDG that was not subject to the treatment process of the disclosure, and a DDG that was treated using the disclosed process. Notably, a peak at about 4.2 minutes is significantly decreased in magnitude from the untreated DDG to the treated DDG, and another peak at about 4.4 minutes is significantly increased from the untreated DDG to the treated DDG. It is believed that this change in magnitude reflects a decrease in the components in the samples that may burn and produce odors at relatively lower temperatures, and a shift to components that are not burned until relatively higher temperatures, in filler material that incorporates the treated DDG. It has been observed that a composition that includes up to (and even exceeds) approximately 75 percent of the filler material does not burn or produce an offensive odor when heated up to temperatures of approximately 380 degrees F. (approximately 193 C) or more, which is not possible using the untreated DDG.

Figure 9:
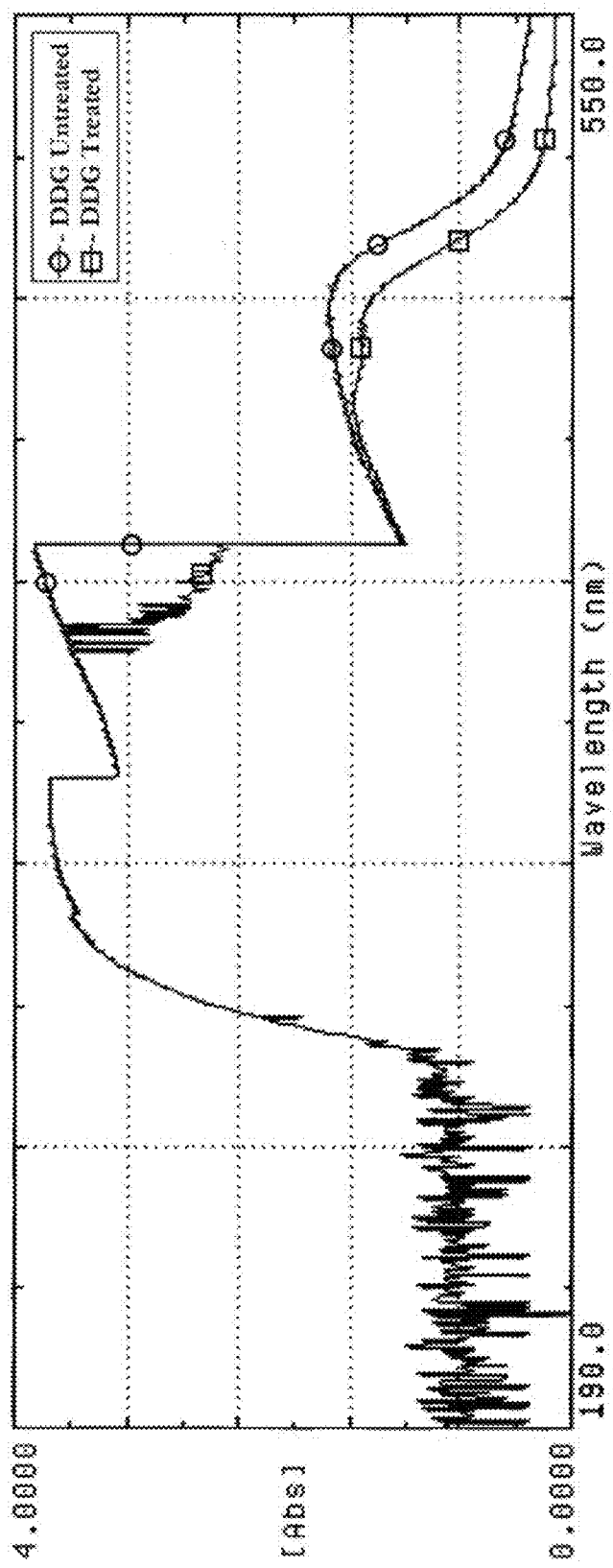
FIG. 9 is a schematic graph from spectrophotometer testing of an untreated DDG sample and a DDG sample treated according to aspects of the disclosed process.

FIG. 9 of the drawings illustrates a graph from spectrophotometer testing of an untreated DDG sample and a DDG sample treated according to aspects of the disclosed process, and comparatively shows the changes in the DDG caused by treatment according to the processes of the disclosure. An untreated DDG sample and a DDG treated according to aspects of the disclosed process were analyzed to detect alteration of the Diferuloylputrescine in the samples. The zein as well as other components of the samples were dissolved in 85 percent ethanol solution and analyzed using the spectrophotometer. The results for the untreated DDG and treated DDG show a difference at the wavelength associated with the presence of Diferuloylputrescine, suggesting that the Diferuloylputrescine was oxidized by the disclosed process, and results in the reduction or elimination of the objectionable odor associated with the Diferuloylputrescine.

Figure 10:
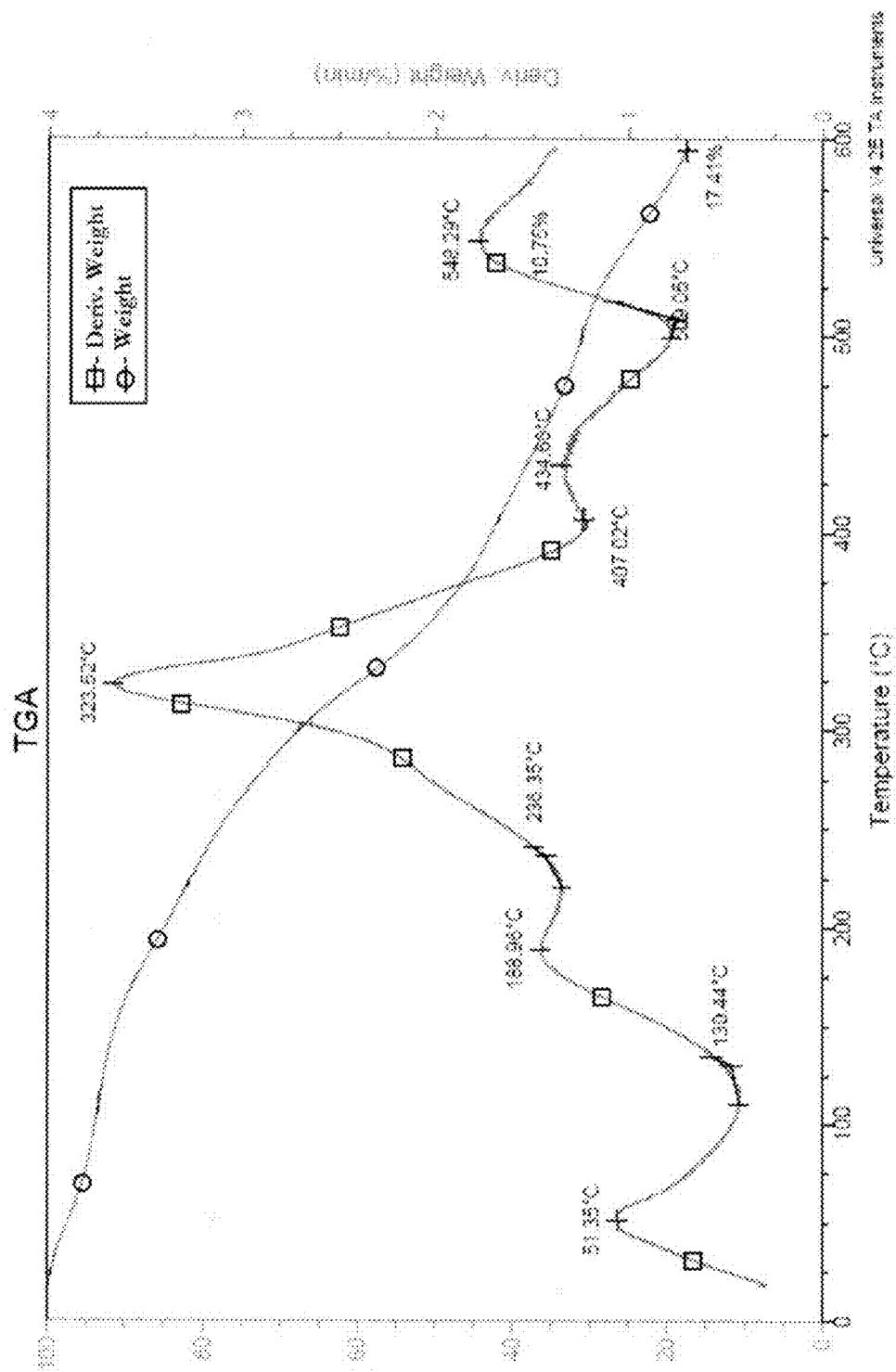
FIG. 10 is a schematic graph of a thermogravimetric analysis of an untreated DDG sample.
Figure 11:
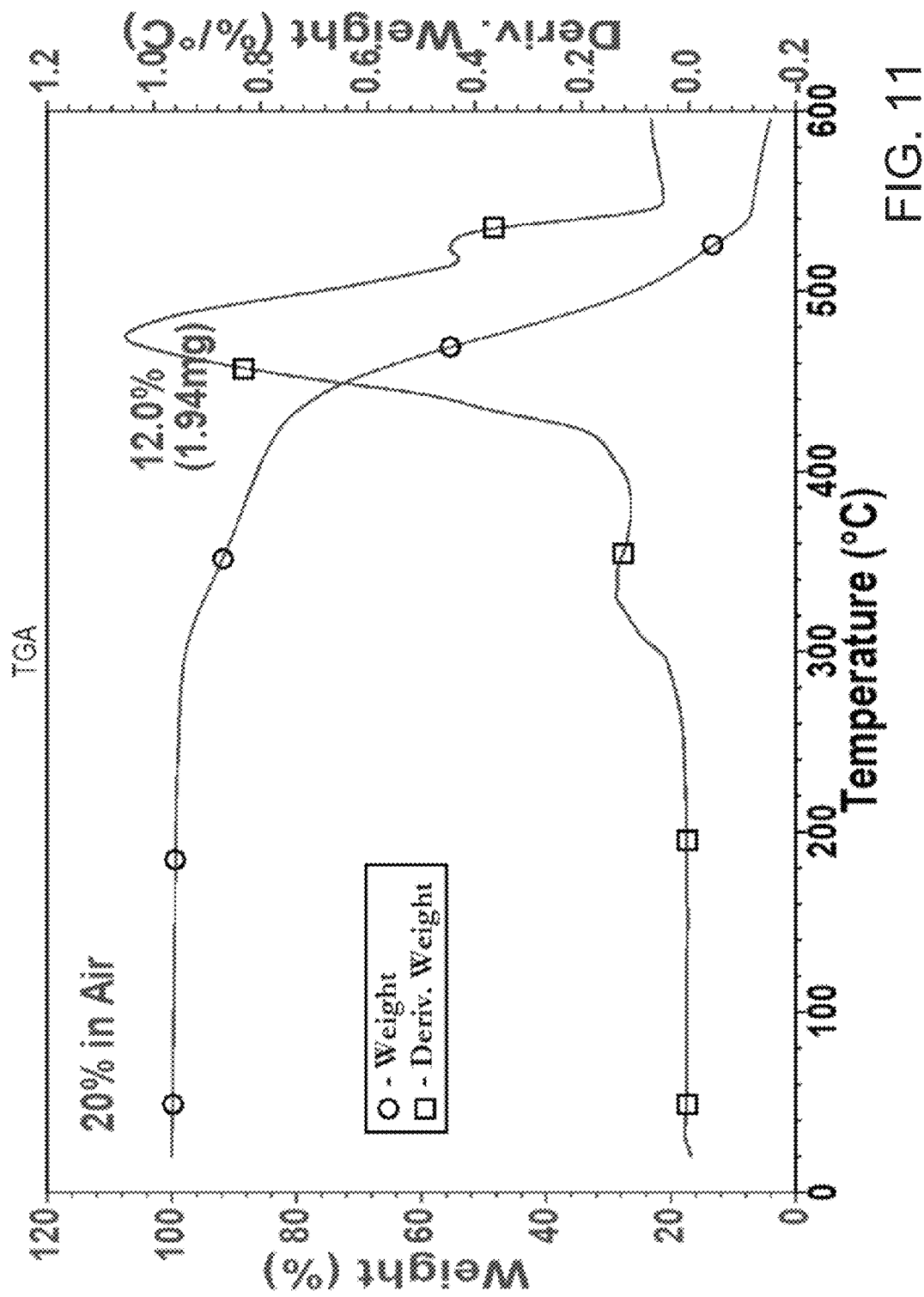
FIG. 11 is a schematic graph of a thermogravimetric analysis of a DDG sample treated according to aspects of the disclosed process.

As an illustration of the increased resistance to thermal degradation provided by aspects of the disclosed processes, FIG. 10 depicts a thermogravimetric analysis of an untreated DDG and shows an onset of degradation of the DDG sample beginning at approximately 266 degrees F. (approximately 130 C) and a loss of about 10 percent of the mass of the sample occurring by approximately 370 degrees F. (approximately 188 C). In contrast, as shown in FIG. 11, a thermogravimetric analysis of a composition including polymer and DDG treated according to the disclosure shows an onset of degradation of the DDG sample beginning at approximately 464 degrees F. (approximately 240 C), a significant raising of this characteristic temperature which is important to the moldability of the composition. These analysis indicate that the components of the untreated DDG in a composition will likely begin to burn off at a significantly lower temperature than a composition including a DDG treated according to the disclosed processes, thus effectively increasing the range of temperatures at which the composition may be worked.

During the process, the hydrogen peroxide may combine with oils and fats from the WDGs to form some type of a soap, and that soap is readily separated from the solids of the WDG by the action of the centrifuge as well as the decanting. Some of the oils in the base material may be transformed into epoxides that may be more compatible with the polymer with which the filler material is subsequently combined. The soap with the relatively smaller chain molecules are removed by the process, and it is believed that these smaller chain molecules contribute to an unpleasant and objectionable odor when heated for compounding with the polymer materials as well as the process employed to mold the composition, such as injection molding. The processing of the composition is thus able to be performed at relatively higher temperatures than if aspects of the process were not performed.

In general, the disclosure thus relates to a method or process of diminishing unpleasant odor in a base to facilitate usage of the base material as an additive or filler in a polymer material to enable use of the composition of the modified base material and polymer material for forming an object. The method generally includes providing a base material, and treating the base material in a manner that may remove odor from the base material, such as by removing oils from the base material and oxidizing the base material including the remaining oils and solubles. The method may also include removing at least some portion of the liquids from the mixture, and drying the mixture to produce a filler material. The method may further comprise altering or reducing the particle size or shape of the filler material to a more suitable size or shape, and may include milling or grinding filler material.

The composition produced using aspects of the disclosure, and in particular in implementations using whole stillage as a base material and microwave drying, produce a composition with the polymer that tends to have higher strength, better impact resistance properties, be extrudable at higher loading percentages, and have improved melting properties than when the base material is an unmodified WDG or DDG. The composition also exhibits greater thermo-stability than would be expected, and in some implementations does not exhibit degradation in character to temperatures of approximately 230 degrees C. or higher.

Unless stated otherwise, all amounts and percentages set forth in this disclosure are measured by weight.

With respect to the above description then, it is to be realized that the optimum dimensional and quantitative relationships for the steps and parts of the disclosed embodiments and implementations, to include variations in quantities, amounts, materials, form, function, manner of operation, use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A method of producing a filler material for combining with a polymer in a product, comprising:
   providing an initial mixture including wet distillers grains with an unfermented grain solids content;
   oxidizing the initial mixture to form a treated mixture;
   removing moisture from the treated mixture; and
   combining the treated material with a polymer into a composition.

2. The method of claim 1 wherein the unfermented grain solids content of the initial mixture is approximately 12 percent to 50 percent by weight.

3. The method of claim 2 wherein a remainder of the initial mixture comprises moisture residual from an ethanol production process.

4. The method of claim 1 wherein the step of providing an initial mixture further includes:
   obtaining a whole stillage fermentation byproduct including an unfermented grain solids; and
   removing moisture from the whole stillage fermentation byproduct to reduce a moisture content of the fermentation byproduct to provide the initial mixture with the unfermented grain solids content of approximately 12 percent to 50 percent by weight.

5. The method of claim 4 wherein the whole stillage fermentation byproduct has a solids content of approximately 1 percent to approximately 45 percent.

6. The method of claim 1 wherein the step of exposing the initial mixture to an oxidizer further includes adding an oxidizer to the initial mixture.

7. The method of claim 6 wherein the step of exposing the initial mixture to an oxidizer further includes agitating the treated mixture.

8. The method of claim 1 wherein the step of exposing the initial mixture to an oxidizer further includes heating the treated mixture.

9. The method of claim 1 wherein the step of exposing the initial mixture to an oxidizer further includes heating the treated mixture during agitation of the mixture.

10. The method of claim 1 wherein the step of removing moisture from the treated mixture further includes centrifuging the treated mixture.

11. The method of claim 10 wherein the step of removing moisture from the treated mixture further includes heating the treated mixture after centrifuging the treated mixture.

12. The method of claim 1 wherein the step of removing moisture from the treated mixture further includes convection heating of the treated mixture.

13. The method of claim 1 wherein the step of removing moisture from the treated mixture further includes microwave heating of the treated mixture.

14. The method of claim 1 wherein the step of removing moisture from the treated mixture further includes convection heating of the treated mixture and then microwave heating of the treated mixture.

15. The method of claim 14 wherein the step of convection heating of the treated mixture is performed in a first geographic location and the step of microwave heating the treated mixture is performed in a second geographic location remote from the first geographic location.

16. The method of claim 1 wherein the steps of providing the initial mixture, oxidizing the initial mixture, and removing moisture from the treated mixture is performed at an ethanol production facility.

17. The method of claim 16 additionally comprising a step of removing further moisture from the treated mixture performed at a geographic location remote from the ethanol production facility.

18. The method of claim 1 additionally comprising changing a physical form of the treated material to a substantially uniform particulate form.

19. The method of claim 18 wherein the step of changing the physical form of the treated material includes milling the treated material.

20. A method of producing a filler material for combining with a polymer in a product, comprising:
   providing an initial mixture including wetted unfermented grain solids;
   oxidizing the initial mixture to form a treated mixture;
   removing moisture from the treated mixture; and
   combining the treated material with a polymer into a composition;
   wherein the composition comprises a preliminary composition; and additionally comprising:
   forming the preliminary composition with a first treated mixture content;

moving the preliminary composition to another geographic location; and forming a final composition by adding additional polymer to the preliminary composition to provide the final composition with a second treated mixture content that is lesser than the first treated mixture content.

21. The method of claim 20 additionally comprising forming a finished product with the final composition.

22. The method of claim 1 wherein the step of providing the initial mixture is performed without adding moisture to the wet distillers grains.

23. The method of claim 1 wherein a moisture content of the initial mixture is moisture residual from an ethanol production process in an ethanol production facility.

24. The method of claim 1 wherein the polymer combined with the treated material is a polymer selected from the group consisting of polypropylene, polyethylene, polyhydroxyalkanoate and polylactic acid.

25. The method of claim 1 wherein the polymer combined with the treated material is a petroleum-derived polymer.

26. The method of claim 1 wherein the wet distillers grain of the initial mixture does not include solubles of an ethanol production process.

27. A method of producing a filler material for combining with a polymer in a product, comprising:

obtaining a quantity of wet distillers grains from an ethanol production facility, the wet distillers grain including an unfermented grain solids content and residual moisture from an ethanol production process;

removing the residual moisture from the wet distillers grains as necessary to provide an initial mixture with an unfermented grain solids content of approximately 12 percent to approximately 50 percent;

oxidizing the initial mixture by mixing hydrogen peroxide with the initial mixture to form a treated mixture and heating the initial mixture while mixing;

removing further residual moisture from the treated mixture; and combining the treated material with a polymer into a composition.

28. The method of claim 27 wherein the method is performed without adding water to the initial mixture and without adding water to the treated mixture.

* * * * *